(12) United States Patent
Moser et al.

(10) Patent No.: US 7,221,491 B2
(45) Date of Patent: May 22, 2007

(54) EFFICIENT MULTI-LINE NARROW-BAND LARGE FORMAT HOLOGRAPHIC FILTER

(75) Inventors: Christophe Moser, Monrovia, CA (US); Sebastien Blais-Ouellette, Laval (CA); Keith Matthews, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/406,452

(22) Filed: Apr. 18, 2006

(65) Prior Publication Data

US 2006/0232839 A1    Oct. 19, 2006

Related U.S. Application Data

(60) Provisional application No. 60/672,260, filed on Apr. 18, 2005.

(51) Int. Cl.
   *G02B 5/32*    (2006.01)
(52) U.S. Cl. .............................................. 359/15; 430/1
(58) Field of Classification Search .................. 359/15; 430/1–2
   See application file for complete search history.

(56) References Cited

U.S. PATENT DOCUMENTS

| 5,335,098 | A | | 8/1994 | Leyva et al. |
|---|---|---|---|---|
| 5,440,669 | A | | 8/1995 | Rakuljic et al. |
| 5,491,570 | A | | 2/1996 | Rakuljic et al. |
| 5,691,989 | A | | 11/1997 | Rakuljic et al. |
| 6,127,066 | A | * | 10/2000 | Ueda et al. .................... 430/1 |
| 6,661,547 | B2 | * | 12/2003 | Kameno et al. .............. 359/15 |
| 6,934,060 | B2 | | 8/2005 | Psaltis |
| 2002/0196486 | A1 | * | 12/2002 | Ingwall et al. ................ 359/15 |

FOREIGN PATENT DOCUMENTS

JP    05-005804    *    1/1993

* cited by examiner

*Primary Examiner*—Leonidas Boutsikaris
(74) *Attorney, Agent, or Firm*—Joseph B. Milstein; Hiscock & Barclay, LLP

(57) ABSTRACT

Narrow-line holographic filters that can include a plurality of lines and that can be structured to provide a large aperture device. Materials that can be used to construct filters include glasses, photorefractive crystals such as lithium niobate and photorefractive thick polymers. The filters are fabricated by assembling a plurality of elements having the same one or more narrow line holographic filter patterns written thereon, in mutual orientation such that each element has a surface defined by a length and a width adjacent a corresponding surface of a neighboring element, and has a surface defined by a thickness and one of a length and a width accessible to impinging illumination. Filters exhibiting a plurality of characteristic narrow lines, and having arbitrarily large apertures can be fabricated. Methods of fabricating and using the filters are described.

7 Claims, 6 Drawing Sheets

EFFICIENT MULTI-LINE NARROW-BAND LARGE FORMAT HOLOGRAPHIC FILTER

CROSS-REFERENCE TO RELATED APPLICATIONS

This application claims priority to and the benefit of U.S. provisional patent application Ser. No. 60/672,260, filed Apr. 18, 2005, which application is incorporated herein by reference in its entirety.

FIELD OF THE INVENTION

The invention relates to holographic filters in general and particularly to holographic filters that provide one or more narrow filter lines in geometries that permit transmission of desired wavelengths over large apertures.

BACKGROUND OF THE INVENTION

Holographic filters have been used for many years. Conventional multi-line filters currently have large spectral bandwidth (typically greater than 10 nm) and a limited number of bands (typically fewer than 5). The large bandwidth is insufficient to resolve narrow spectral features in many applications, such as spectroscopy, spectral imaging and astronomical applications. The limited number of bands imposes limitations on the performance of conventional filters.

The prior art in the field of holographic filters is described in numerous printed publications and issued patents. A review of selected prior art literature including descriptions of methods of preparing and using holographic filters, and some applications of prior art holographic filters, is now presented in brief overview.

The top portion of FIG. 1(A) illustrates a prior art method of fabricating a holographic filter using the so-called reflection geometry. The prism allows steep angles to be coupled in the medium, which can generate filters in the infrared wavelength range of interest. The glass-glass interface (or other interfaces with similar refractive indices) between the prism and the holographic material can be filled with a commercially available matching fluid to eliminate reflections at the interface between the two solids. In FIG. 1, vector $k_r$ denotes a propagation vector of a coherent beam of light that is sometimes termed a reference beam, and vector $k_s$ denotes a propagation vector of a coherent beam of light that may include information that is sometimes termed a signal beam. In some instances, the two beams are coherent beams originating from the same source. The bottom portion of FIG. 1(A) illustrates the read-out of the holographic filter using a infrared probe beam having a propagation vector $k_{IR}$ and the resulting reflected beams having various propagation vectors $k_d$. The diagrams shown in FIG. 1(B) illustrate the vectorial relationships that exist among the propagation vectors.

A multi-band spectral filter is fabricated by superimposing many narrow band filters with different central wavelengths in the same volume. The fabricated filter is used at almost normal incidence. The wavelengths of the incident beam that match the periods of the Bragg grating recorded in the holographic filters are reflected and therefore filtered from the incident beam. The thickness of the recorded material is limited by absorption of the recorded beam. All holographic materials have absorption at the recorded wavelength. In most instances, the thickness is limited to a couple of millimeters.

An example of a multi-line holographic filter useful for identifying a specific material based on a precise match between the spectral lines characteristic of the material and spectral bands built into the filter is described in U.S. Pat. No. 6,934,060 to Psaltis, which patent is assigned to the assignee of the present application.

U.S. Pat. No. 5,491,570 to Rakuljic at al. describes methods of writing and reading reflective plane holographic gratings that are matched at the Bragg condition to infrared radiation. The patent describes writing the gratings using either transmission mode, in which two incident beams impinge on the same face, or reflective mode, in which two incident beams impinge on opposite faces, of a crystal specimen of lithium niobate ($LiNbO_3$) possibly doped with iron (e.g., 0.05% $Fe:LiNbO_3$). Anti-reflection coatings can be applied to the crystal surface to reduce reflection losses and to improve the efficiency of the grating.

U.S. Pat. No. 5,335,098 to Leyva et al. describes some of the physics underlying the generation of holographic gratings in various materials, such as photorefractive materials. The patent describes and claims methods of developing and fixing holographic gratings that rely on the application of electric fields and thermal treatments, simultaneously or in sequence. The patent also claims filters for reflecting a single band, and mentions wavelength multiplexed holograms. U.S. Pat. No. 5,440,669 to Rakuljic et al., which matured from the parent application of the application that earlier matured into U.S. Pat. No. 5,335,098, also discusses methods of making and uses of holographic recordings. Each of U.S. Pat. Nos. 5,335,098, 5,440,669, 5,491,570, and 6,934,060 is incorporated by reference in its entirety herein.

There is a need for holographic filters that provide both a plurality of narrow lines and offer the possibility of large effective apertures.

SUMMARY OF THE INVENTION

In one aspect, the invention features a narrow-line holographic filter. The narrow-line holographic filter comprises an assembly of at least two filter elements. Each of the filter elements has a length, a width and a thickness. The thickness is smaller than either the length or the width. Each of the filter elements has at least one narrow-line holographic filter pattern written thereon, each of the at least one narrow-line holographic filter pattern corresponding to a specified wavelength. The at least two filter elements are positioned in the assembly with a surface of one element determined by the length and the width of the element adjacent to a corresponding surface of another element.

In one embodiment, the filter further comprises a surface accessible to illumination having an area substantially equal to a number representing the quantity of filter elements therein multiplied by an area of a single filter element accessible to illumination. In one embodiment, the filter is configured to reflect light corresponding to at least one of the narrow-line holographic filter patterns present in the holographic filter. In one embodiment, the filter is configured to transmit light having a wavelength different from a wavelength corresponding to any narrow line holographic filter pattern present in the holographic filter.

In another aspect, the invention relates to a method of fabricating a narrow-line holographic filter. The method comprises the steps of providing at least two filter elements fabricated in one or more pieces of a substrate material, by performing steps (1) and (2) in any order. Step (1) involves writing on the substrate material at a position corresponding to one of the at least two filter elements at least one narrow-line holographic filter pattern corresponding to a specified wavelength. Step (2) involves cutting the substrate material into elements having corresponding dimensions of length, width, and thickness. The method also includes assembling the at least two filter elements into the narrow-line holographic filter such that the at least two filter elements are positioned in the assembly with a surface of one element determined by the length and the width of the element adjacent to a corresponding surface of another element. In one embodiment, steps (1) and (2) each may be repeated as many times as required to prepare a desired filter element having at least two lines.

In one embodiment, the invention also provides a method of operating a narrow-line holographic filter. The method comprises the step of providing a narrow-line holographic filter according to the paragraph preceding this paragraph. The method of operating the filter also includes the steps of causing illumination to be filtered to impinge on a surface of the narrow-line holographic filter corresponding to an area defined by a thickness and a selected one of a length and a width of at least one filter element in the narrow-line holographic filter, thereby reflecting at least one specified wavelength corresponding to a narrow-line holographic filter pattern in the filter, and transmitting a wavelength that does not correspond to at least one narrow-line holographic filter pattern in the filter; and observing at least a selected one of the reflected wavelength and the transmitted wavelength.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
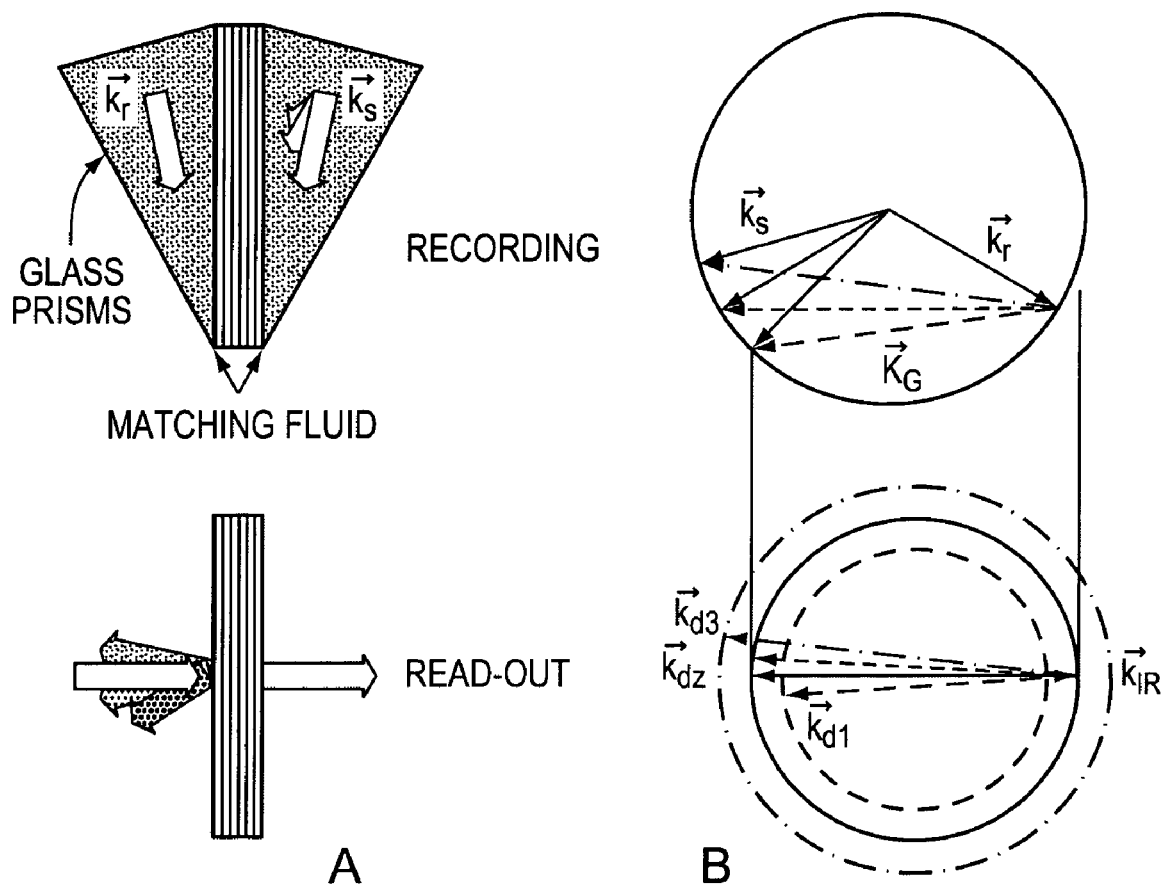
FIG. 1 shows a prior art method of recording and reading out a multi-band holographic filter using reflection geometry.

The invention is embodied in a narrow line holographic filter that can include a plurality of lines and that can be structured to provide a large aperture device. Materials that can be used to construct filters according to the principles described herein include glasses, photorefractive crystals such as lithium niobate and photorefractive thick polymers. The material in one embodiment is provided as a sheet, which may be referred to as a substrate, having dimensions of length, width and thickness measured in three mutually perpendicular directions, in which the length and width dimensions are significantly larger than the thickness dimension of the sheet or substrate, in analogy to silicon wafers, glass laboratory slides, or sheets of paper. In overview, filters that embody the principles of the invention comprise a plurality of filter elements, each element being a piece of material upon which is written one or more narrow line holographic filter patterns using illumination that impinges on the sheet face (i.e., the large surface defined by the length and width dimensions). The filter elements are then assembled with their large faces adjacent one another, so that the filter can be used by causing light to impinge on one or more of the narrow exposed faces of the assembled elements (i.e., a face representing a thickness dimension and either a length or a width dimension). In one embodiment, the filter is used to reject by reflection light corresponding to at least one of the narrow-line holographic filter patterns present in the holographic filter, and to transmit light having a wavelength different from any narrow-line holographic filter pattern present in the holographic filter. The detailed description given herein teaches first preparing the holographic pattern for one or more filter elements on a single sheet of material and then cutting slices or elements from the sheet of material. In principle, in an alternative sequence, one can first cut a number of unprocessed blanks, and then process them individually for assembly into the filter. Although the term "cut" is used to describe the process of converting a single sheet of material into a plurality of slices or elements, it is to be understood that any technique, for example, sawing and polishing, scribing and breaking, or etching, that successfully accomplishes this operation is contemplated. One can assemble filter elements made by either or both process sequences into a single array. In some embodiments, each filter element can be tilted in order to optimally match the rejected or filtered wavelengths provided by two or more elements. Examples of the fabrication and use of such filters are presented in greater detail hereinbelow.

The holographic filter is recorded in transmission geometry with plane waves. The multi-line capability is realized by a multiplexing scheme in which multiple narrow line filter holographic patterns are written in the same volume of material. The large format (or large aperture) filter is used in reflection geometry by assembling a plurality of filters having identical multi-line holographic patterns by juxtaposing filter elements in a mosaic structure. This construction maximizes the efficiency and bandwidth of the filter by enabling the selection of the thickness of the filter after the recording. The aperture area, or the dimension of the surface of the filter that is available for interaction with light can be arbitrarily large, and is limited only by the number of elements that can be assembled into an array. The aperture area is substantially equal to the number of elements assembled times the size of the face of each element that is oriented for illumination. In some embodiments, the array can include a two-dimensional array, constructed for example by placing multiple arrays adjacent each other, or making a single array by placing two or more "stacks" in a tile pattern. The tile pattern can be any pattern that covers an area, such as a pattern similar to a window with muntins, a brick wall, a parquet floor, or a multi-element reflector for a telescope.

Figure 2:
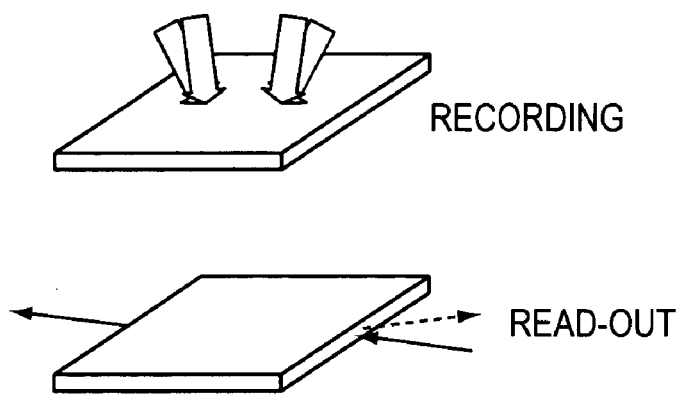
FIG. 2 is a schematic diagram illustrating a method of recording and reading out a multi-band holographic filter using transmission geometry.

The recording geometry used in one embodiment is the so-called transmission geometry shown in FIG. 2. The plane waves are incident on the same facet of the material. In one embodiment, the multiplexing can be implemented by changing the angle between the recording beams sequentially. One records a first grating with the two incident beams aligned at a first angle of incidence, and then one records another grating with the two beams aligned at a second angle of incidence. In another embodiment, one can simultaneously generate multiple plane waves using beamsplitters and phase masks to generate a multi-line filter.

The filter is used in the reflection geometry as is illustrated in the lower portion of FIG. 2. The thickness of the crystal or other material in which the holographic filter is constructed is limited to a dimension of a few millimeters because of absorption. The length of the filter that the incident light experiences (or "sees") is determined by the size of the recording material, which can be arbitrarily large. Large areas of the recording material can be exposed in the same way to produce appreciable areas of substantially identical holographic filter material, either by using large area illumination to expose large areas at one time, or alternatively by using a step and repeat technique in which one defined area is exposed, the illumination system and recording material are moved relative to each other, and an unexposed region is then sequentially exposed. In some instances, the recording material can have dimensions of several tens of centimeters, and in the future, possibly meters. The efficiency and bandwidth of the filter is proportional to this interaction length and therefore can be easily controlled by dicing the material after recording, as will now be explained.

Figure 3:
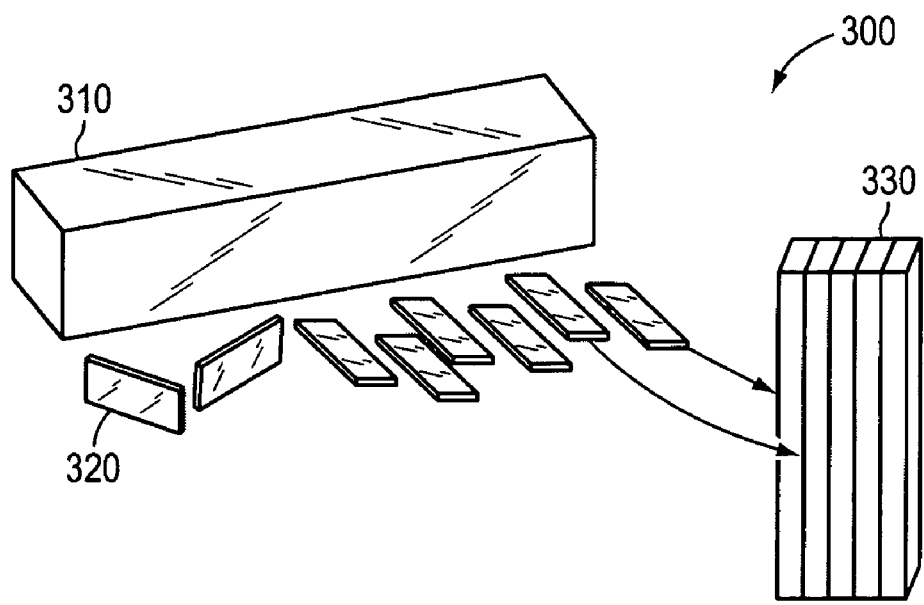
FIG. 3 is a diagram that illustrates the mosaic structure of a large format multi-line efficient filter, according to principles of the invention.

FIG. 3 is a diagram 300 that illustrates the mosaic structure of a large format multi-line efficient filter. In FIG. 3 there is shown a sizeable single crystal 310 of a suitable material for processing into holographic filters, such as $LiNbO_3$. A number of slices 320 that are processed into individual filter elements are also shown. A ruler is present to provide a sense of the scale of the individual elements 320. In order to build a large format filter, two or more filter elements 320 are fabricated, either on separate pieces of material or on one larger piece of material that is then cut. The elements are then assembled in a mosaic structure 330 as shown on the right in FIG. 3. The individual filter elements 330 can be maintained in position relative to each other by any convenient means, for example, by being optically contacted, fused, bonded with a glue, epoxy or cement, chemically bonded (e.g., Schott's process), clamped or put together with an index matching fluid. For a configuration where the light does not go through the bonds, there does not need to be index matching and the optical quality of the bond is unimportant.

Current recording technology limits the physical width of the filter elements to a few millimeters, which corresponds to the thickness of the material used in the recording technology. On the other hand, the length of a filter element is not intrinsically limited. As an example, it is possible to bond together many filter elements to build large format filters suitable for applications involving telescopes. The image on the right side of FIG. 3 shows an example comprising an 18×30 mm assembly 330 comprising six slices 320, each having lengths of 30 mm and thicknesses of 3 mm, and each situated adjacent to at least one neighbor. In this configuration, it is useful to cover the interface between individual elements at the free surface of the assembly with an opaque medium to avoid stray light due to total internal reflection. These losses are expected to be greatly reduced in the near future by increasing the slice thickness to 9 mm. In one embodiment, the desired acceptance angle of the filter provides a limit on how thin the individual elements can be. For a filter where the acceptance angle is small, the thickness dimension can also be reduced. For many filters, in order to have a suitable geometrical angular acceptance of the filter, the thickness is more than about 0.5 mm.

Figure 4:
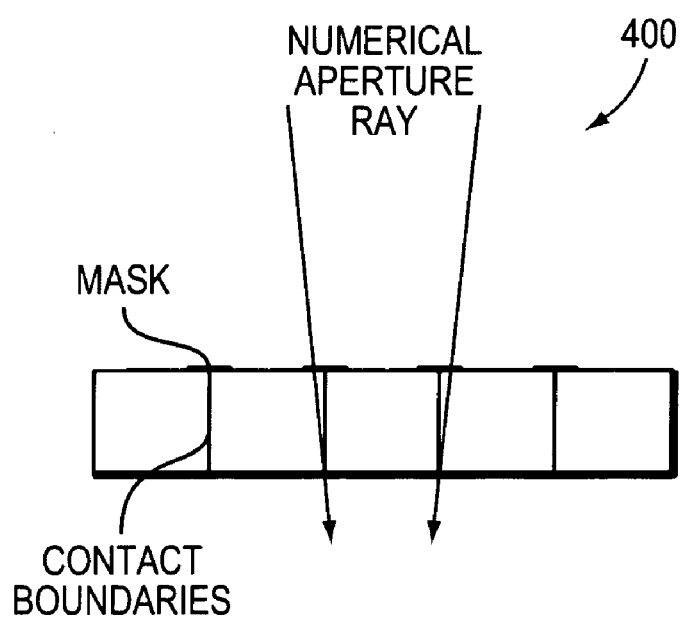
FIG. 4 is a schematic side view of a mosaic filter showing an opaque material deposited on the seams between adjacent filter elements to avoid scattering, according to principles of the invention.

FIG. 4 is a schematic side view 400 of a mosaic filter showing an opaque material 410 deposited on the seams between adjacent filter elements to avoid scattering. The opaque material is deposited as a small masking line. The opaque material can be any convenient material such as, for example, a metal or a carbon-based black.

Figure 5:
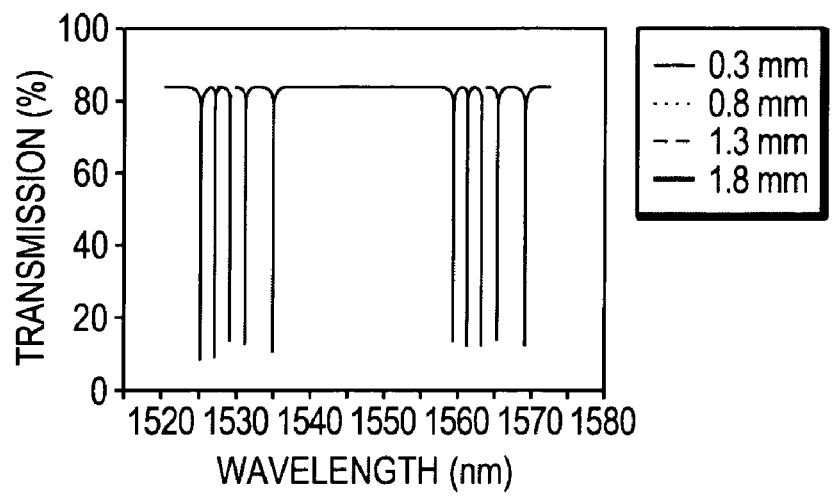
FIG. 5 is a diagram that shows the transmission as a function of wavelength for a 10 band multi-line holographic filter, according to principles of the invention.

The transmission geometry recording process enables efficient and narrow band multi-line filters. FIG. 5 is a diagram that shows the performance of a 10 line filter in which each line has a FWMH=0.1 nm bandwidth and greater than 70% efficiency. The filter was recorded 5 times at different places on the same substrate. All 5 sets of 10 lines fell at the desired wavelength at +0.02 nm to −0.08 nm. The percent transmission shown is in the absence of an antireflection coating, which if present would raise the maximum transmission to about 90%. The dimensions 0.3 mm, 0.8 mm, 1.3 mm and 1.8 mm refer to measurements made at different positions along the surface of the holographic filter. The measurements at the different locations are very similar.

Two different theories are generally used to study the diffraction of light from volume holograms. In the weak grating regime, which means that higher-order scattering by the hologram is negligible, Born's approximation is often used to predict the diffraction efficiency of a volume hologram. However, in the strong grating regime, Born's approximation breaks down and coupled wave theory must be applied.

The bandwidth of highly diffracting holograms is proportional to the refractive index change:

$$\Delta\lambda = \lambda_0 \Delta n / 2n$$

Figure 6:
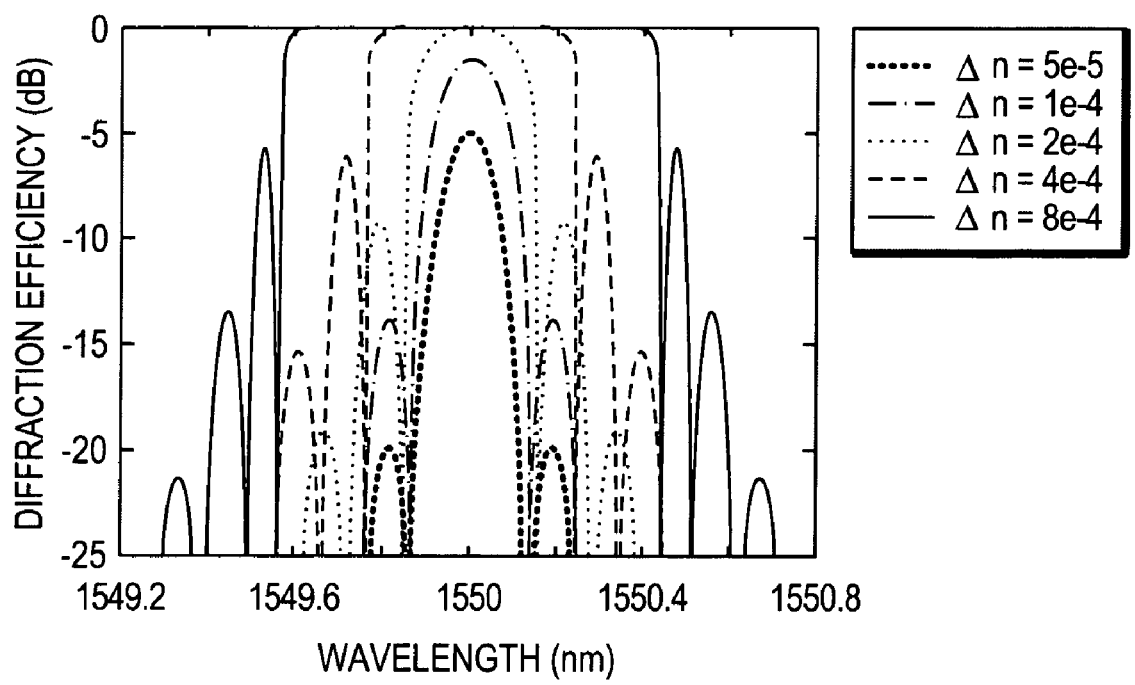
FIG. 6 is a diagram the shows the dependence of spectral bandwidth on refractive index modulation amplitude for strong volume gratings, according to principles of the invention.
Figure 7:
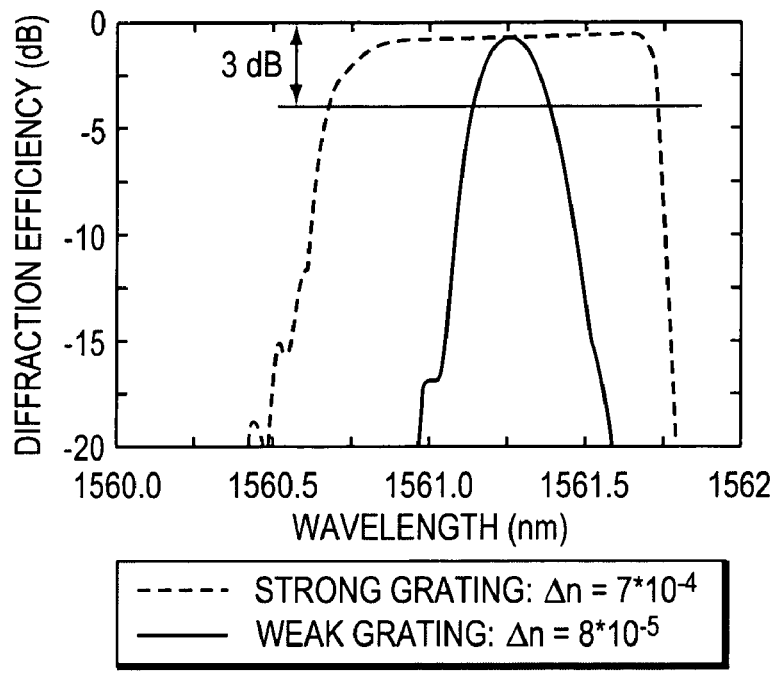
FIG. 7 is a diagram showing experimental measurement of the spectral response of two reflection gratings recorded in a 14 mm thick glass material, according to principles of the invention.

$\Delta n$ in turn is determined by the recording exposure time. Therefore, the spectral bandwidth of each hologram can be controlled by carefully choosing the exposure time during the hologram recording. The diffraction efficiencies of five reflection gratings with different index modulation depths recorded in a 10 mm thick photosensitive glass (n=1.486)

are plotted in FIG. 6. It can be seen that the spectral bandwidth starts to increase as Δn reaches $5\times10^{-5}$. When Δn is below $5\times10^{-5}$, the grating is still in the weak grating regime, and the spectral bandwidth is determined by the grating length. FIG. 7 shows the experimental result of two reflection gratings recorded in a 14 mm thick glass material. This result demonstrates that the bandwidth of single filters can be manipulated by adjusting the exposure time.

Figure 8:
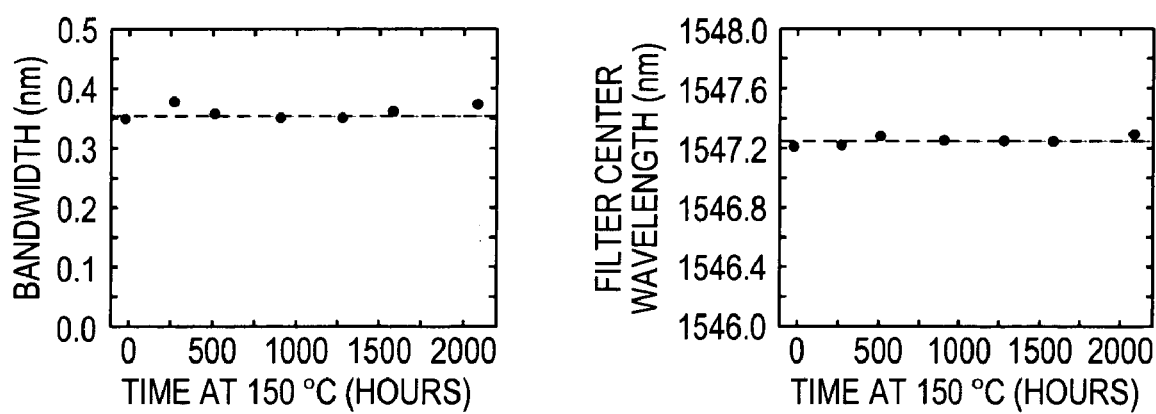
FIG. 8 is a diagram showing the stability of the central filter frequency and bandwidth of a holographic filter subjected to 150° Celsius for up to 2000 hours as an accelerated aging test, according to principles of the invention.

Another inherent advantage of holographic filters is their relative robustness. To test their lifetime, a holographic filter constructed according to the principles of the invention was submitted to prolonged exposure to elevated temperature. The filter amplitude has shown no degradation after more than 2000 hours at 150 degrees Celsius. The filter quality is measured by its center frequency stability and bandwidth. The result of this accelerated aging test at elevated temperatures is shown in FIG. 8.

Exemplary Applications

A variety of applications in which filters embodying features of the invention can be used will now be discussed. In principle, any imaging system that requires blocking one or multiple light beams and transmitting the remainder of the illumination is a suitable candidate for use of filters embodying principles of the invention.

One application of such filters is to use them as rejection filters for fluorescence measurements. A filter can be provided with a narrow-line holographic filter element tuned to the wavelength of the excitation laser light. This illumination will then be removed by reflection, while the remaining illumination will pass through the filter. In flow cytometry for example, multiple laser wavelengths are used to excite compounds. A multi-line filter can be provided to block simultaneously each of the excitation wavelengths and to transmit the fluorescence. The typical linewidth of the multi-line filter ranges from about 0.01 nm to 1 nm in the visible range, which is extremely narrow compared to the conventional state-of-the-art fluorescence filter with 10 nm linewidth.

Another application relates to filtering in astronomical observations. Near infrared wavelengths (1 to 2.5 micrometers) are increasingly seen as the best window to observe a wide range of fascinating astronomical phenomena, from the nascent universe to the birth of stars, to direct observations of exo-planets. These wavelengths are less prone to interstellar extinction, and are easier to correct for atmospheric perturbations than their visible counterpart. However, near infrared observations greatly suffer from night sky emission mainly caused by excited OH radicals in the atmosphere. These narrow emission lines dominate the inter-line sky emission by many orders of magnitude. Removing a few tens of these lines can lead to a twofold or threefold increase in signal-to-noise ratio (SNR). SNR is proportional to the telescope diameter. Such filters could procure a SNR gain equivalent to a 30 m class telescope when used on a 8–10 m telescope. Filters with 10 lines have been tested and show positive features that can be used in these new devices.

The center wavelength of the holographic_filter depends on the incidence angle inside the material according to the relation:

$$\lambda_R = \Lambda n / 2(1+\cos(2\alpha))]^{1/2}$$

where Λ is the grating period and n the index of refraction. The bandwidth of the filter needs to be large enough to accommodate for the wavelength shift caused by the off-axis angles in the imaging system of the telescope. With a focal ratio of 16, the shift is equal to 0.3 nm at 1.5 μm.

Figure 9:
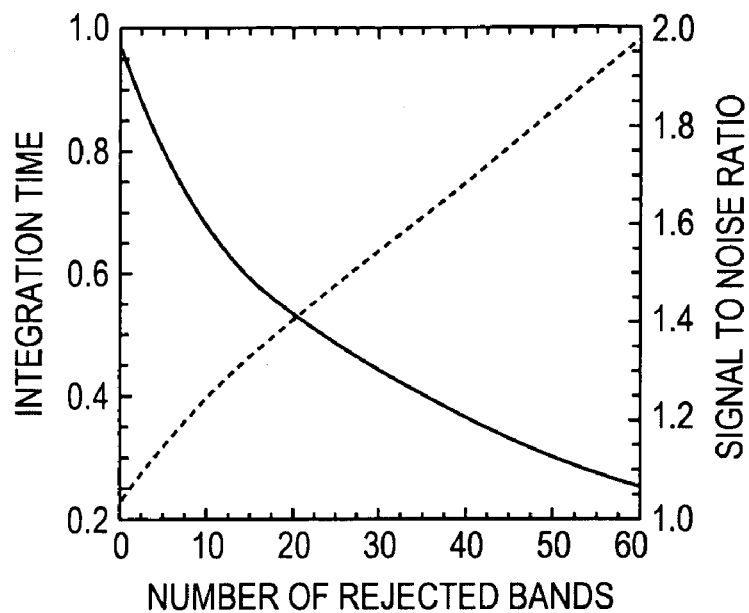
FIG. 9 is a diagram that illustrates the result of a simulation of the gain in integration time and signal to noise when using a multi-notch filter in a f/16 beam, according to principles of the invention.

A more rigorous analysis of the filtering response of a telescope beam with a given F-number by the holographic filter has been developed using IDL. IDL is a software product useful for performing data analysis and visualization that is available from Research Systems, Inc. of 4990 Pearl East Circle, Boulder, Colo. 80301, and is discussed in greater detail at http://www.rsinc.com. An IDL simulation evaluates the signal-to-noise ratio of infrared imaging of an extended source in the astronomical J (1–1.25 μm), H (1.5–1.8 μm), and K (2–2.5 μm) bands. It takes into account a real infrared sky spectrum, including OH-lines and thermal emission, a multi-notch filter with various number of reflecting bands, bandwidths, as well as reflection and out-of-band efficiencies. It also includes detector read-out noise and dark current. The simulation shows the possibility of increasing observing efficiency by large factors. For example, one can halve the observing time for full H band imaging by removing 25 OH lines. FIG. 9 shows the gain in integration time and in signal-to-noise against the number of OH emission lines removed.

Figure 10:
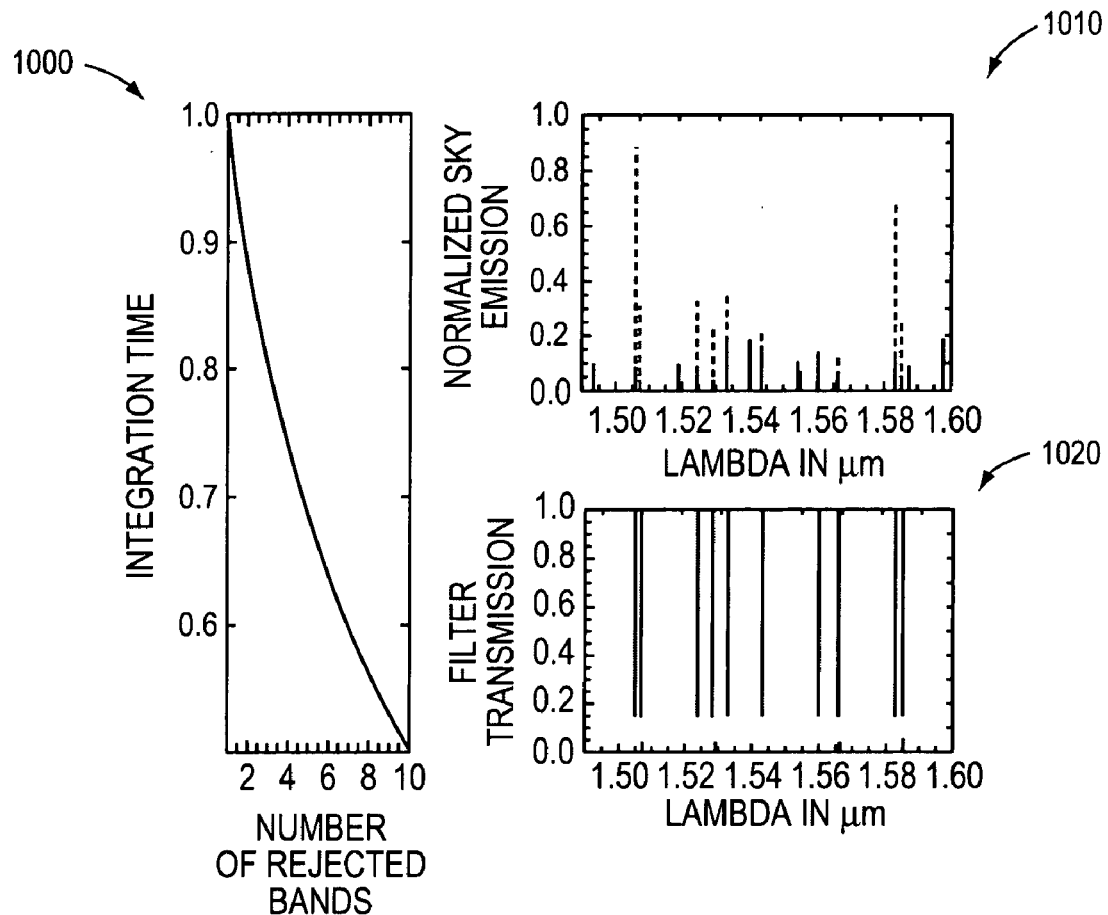
FIG. 10 is a diagram that shows a simulation of the gain in integration time and signal to noise ratio when using a 10 notch filter in a f/16 beam, according to principles of the invention.

The gain is even more dramatic when the observations are restricted to a sub-band. The challenge in building holographic filters resides more in the number of reflecting bands than in the band density. It is thus interesting to explore the possibilities for applying the filter technology to narrower bands than J, H, and K. As an example, the left hand pane 1000 of FIG. 10 shows that removing 10 lines from the still fairly large 1.49–1.6 μm band reduces the observing time by half to reach a given signal-to-noise ratio. The pane 1010 on the upper right hand side of FIG. 10 shows the sky emission spectrum with the 10 lines to be removed shown as dotted lines. The lower right hand pane 1020 of FIG. 10 shows the wavelengths of the 10 narrow-line holographic filter and their reduced transmission characteristic used to remove the 10 lines indicated as dotted lines in pane 1020.

Figure 11:
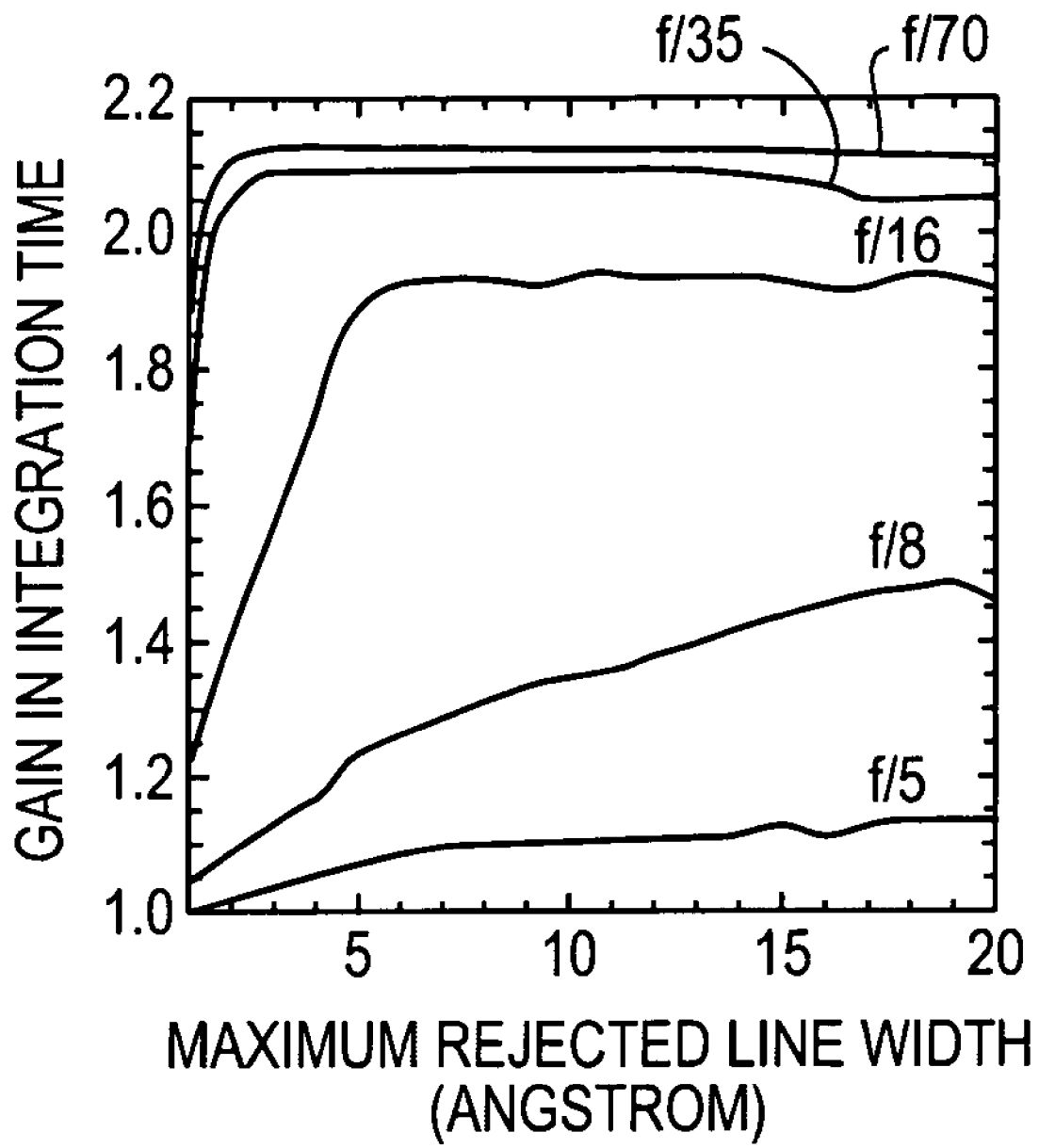
FIG. 11 is a diagram that shows the efficiencies of a 20 line filter for the 1.45–1.6 µm band against the notches maximum width for various f numbers, according to principles of the invention.

Filter efficiency is a function of notch bandwidth because of the wavelength shift due to off-axis angle. As shown in FIG. 11, a steady efficiency increase is seen for increasing bandwidth and reaches a maximum value that depends on the F number, as expected. The curves shown correspond to f/70, f/35, f/16, f/8, and f/5, going from top to bottom. Increasing bandwidth is thus desirable but requires a high modulation of the glass index of refraction. Current technology allows up to 0.2 nm bandwidth but larger bandwidths are expected to be available soon.

Although all of the examples presented hereinabove describe situations in which it is desired to remove specific narrow-line bands from a source of illumination so as to observe the remaining transmitted light, narrow-line filters of the invention can also be used to observe one or more specific narrow-line bands in a source of illumination by reflecting those lines from the filter, observing the reflected line or lines, and permitting all other unreflected illumination to pass through the filter in transmission. In some situations, it may be of interest to observe both reflected illumination and transmitted illumination, for example to measure the excitation intensity of the source in the fluorescence measurement described hereinabove, and to measure the fluorescent response of one or more samples so as to determine such features as the relative responses of the samples, corrected for excitation intensity.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. An arbitrarily large aperture narrow-line holographic filter, comprising:
an assembly of at least two filter elements, the at least two filter elements having identical multi-line holographic patterns therein, wherein:
each of said filter elements has a length, a width and a thickness wherein said thickness is smaller than either said length or said width;
each of said filter elements has at least two narrow-line holographic filter patterns written thereon, each of said at least two narrow-line holographic filter patterns corresponding to a specified wavelength; and
said at least two filter elements are positioned in said assembly with a surface of one element determined by said length and said width of said element adjacent to a corresponding surface of another element.

2. The arbitrarily large aperture narrow-line holographic filter of claim 1, wherein said filter further comprises a surface accessible to illumination having an aperture area substantially equal to a number representing the quantity of filter elements therein multiplied by an area of a single filter element accessible to illumination.

3. The arbitrarily large aperture narrow-line holographic filter of claim 1, wherein said filter is configured to reflect light corresponding to at least one of said narrow-line holographic filter patterns present in said holographic filter.

4. The arbitrarily large aperture narrow-line holographic filter of claim 1, wherein said filter is configured to transmit light having a wavelength different from a wavelength corresponding to any narrow line holographic filter pattern present in the holographic filter.

5. A method of fabricating an arbitrarily large aperture narrow-line holographic filter, comprising the steps of:
(a) providing at least two substantially identical multi-line filter elements fabricated in one or more pieces of a substrate material, by performing steps (a)(1) and (a)(2) in any order:
(a)(1) writing on said substrate material at a position corresponding to one of said at least two filter elements at least two narrow-line holographic filter patterns corresponding to a specified wavelength; and
(a)(2) cutting said substrate material into elements having corresponding dimensions of length, width, and thickness; and
(b) assembling said at least two substantially identical multi-line filter elements into said narrow-line holographic filter such that said at least two substantially identical multi-line filter elements are positioned in said assembly with a surface of one element determined by said length and said width of said element adjacent to a corresponding surface of another element.

6. The method of fabricating an arbitrarily large aperture narrow-line holographic filter of claim 5, wherein steps (a)(1) and (a)(2) each maybe repeated as many times as required to prepare a desired filter element having at least two lines.

7. A method of operating an arbitrarily large aperture narrow-line holographic filter, comprising the steps of:
providing an arbitrarily large aperture narrow-line holographic filter according to claim 5;
causing illumination to be filtered to impinge on a surface of said narrow-line holographic filter corresponding to an area defined by a thickness and a selected one of a length and a width of at least one filter element in said narrow-line holographic filter, thereby reflecting at least one specified wavelength corresponding to a narrow-line holographic filter pattern in said filter, and transmitting a wavelength that does not correspond to at least one narrow-line holographic filter, pattern in said filter; and
observing at least a selected one of said reflected wavelength and said transmitted wavelength.

* * * * *